United States Patent [19]

Barr

[11] Patent Number: 5,581,233
[45] Date of Patent: Dec. 3, 1996

[54] VEHICLE DOOR LOCK, SHIFT LEVER INTERLOCK SYSTEM

[76] Inventor: William A. Barr, P.O. Box 13, Gibson Island, Md. 21056

[21] Appl. No.: 471,391

[22] Filed: Jun. 6, 1995

[51] Int. Cl.⁶ ............................................. B60Q 1/00
[52] U.S. Cl. ..................... 340/457; 340/456; 200/61.88; 200/61.91; 307/10.1
[58] Field of Search ................... 340/456, 457, 340/542, 425.5; 200/61.88, 61.91; 307/9.1, 10.1; 70/262, 263, 264, 237, DIG. 49

[56] References Cited

U.S. PATENT DOCUMENTS

| | | | |
|---|---|---|---|
| 2,717,169 | 9/1955 | Lindbloom | 70/254 |
| 3,359,767 | 12/1967 | Arlauskas et al. | 70/254 |
| 3,381,269 | 4/1968 | Fierbaugh et al. | 340/456 |
| 3,830,332 | 8/1974 | Fontaine | 180/281 |
| 3,871,474 | 3/1975 | Tomlinson et al. | 180/273 |
| 4,233,296 | 9/1980 | Kim et al. | 340/568 |
| 4,353,055 | 10/1982 | Kawakatsu et al. | 340/457 |
| 4,482,885 | 11/1984 | Mochida | 340/457 |
| 4,495,484 | 1/1985 | Kawakatsu et al. | 340/457 |
| 4,617,812 | 10/1986 | Rogers | 70/280 |
| 4,871,994 | 10/1989 | Takeda et al. | 340/457 |
| 4,897,632 | 1/1990 | Hock et al. | 340/457 |

*Primary Examiner*—Jeffrey Hofsass
*Assistant Examiner*—Van T. Trieu
*Attorney, Agent, or Firm*—Oblon, Spivak, McClelland, Maier & Neustadt, P.C.

[57] ABSTRACT

A put-in-park alarm which is energized whenever an automatic shift vehicle is stopped but the shift lever is not in park. The put-in-park alarm is energized when the driver moves his door handle in a door opening direction. Not only is the alarm energized but the door cannot be opened until the shift lever is moved to park whereupon the signal is deenergized, but the door is unlocked upon a second movement of the handle in a door opening direction. The invention includes a broken/maladjusted alarm which is different from the put-in-park alarm but produces substantially similar results.

23 Claims, 2 Drawing Sheets

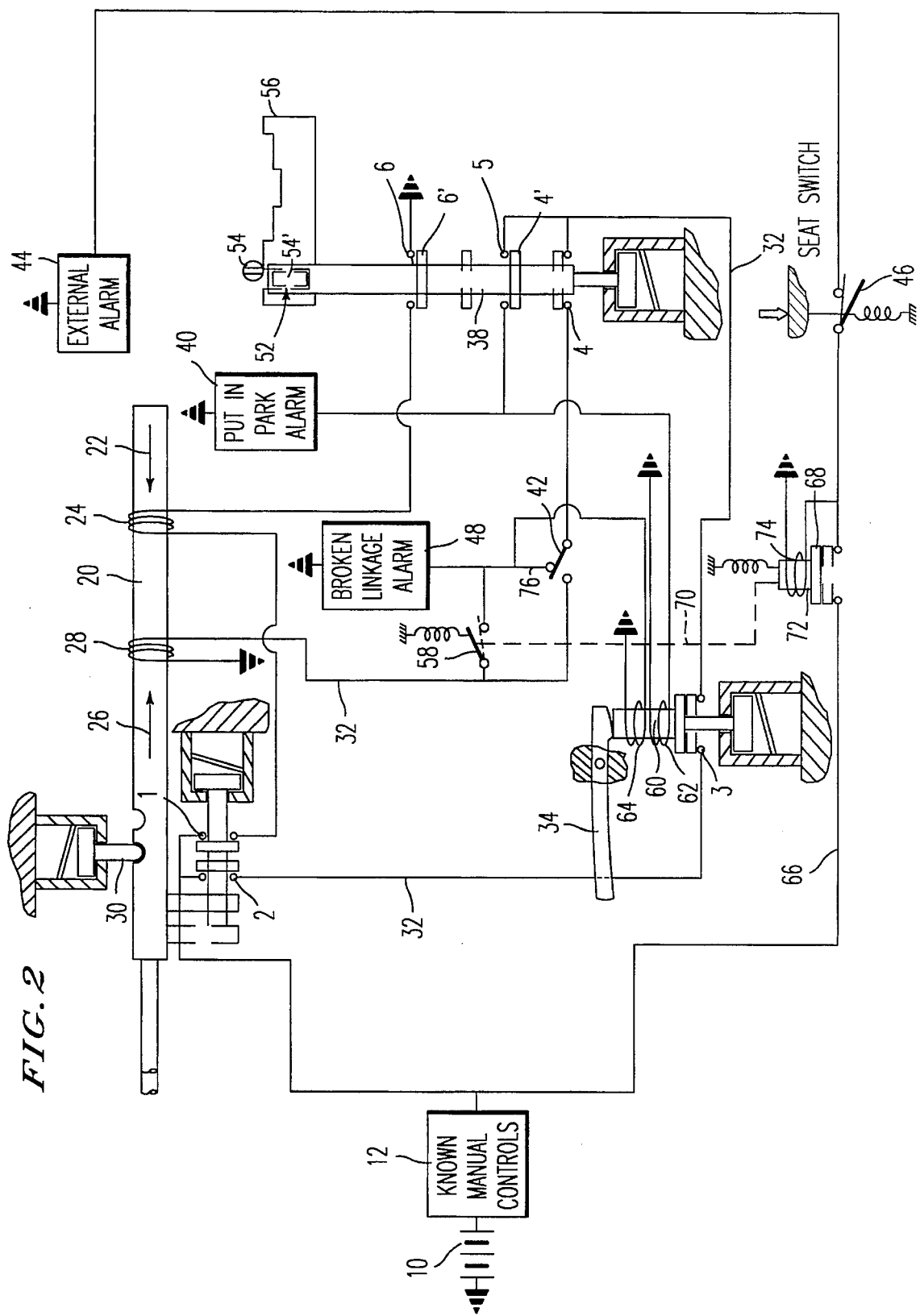

VEHICLE DOOR LOCK, SHIFT LEVER INTERLOCK SYSTEM

BACKGROUND OF THE INVENTION

1. Field of the Invention

This invention relates to safety systems for automatic transmission vehicles and more particularly to a system whose primary function is to warn a driver when he has stopped his vehicle but failed to place the shift lever in park, where "park" means "latched park" so that the vehicle is properly restrained. The system includes subsidiary safety features which will become apparent as the description proceeds.

2. Background of the Invention

The patent to Mochida, U.S. Pat. No. 4,482,885, is representative of systems which sound an alarm when a driver prepares to leave a vehicle with the transmission selector lever not in park. There are prior numerous other examples, including applicant's own prior U.S. Pat. No. 5,015,991, of alarms which are sounded when the driver is remiss in attending to matters affecting the safety of a vehicle presumably parked in a non-lethal condition. For example, alarms are sounded to remind a driver to remove the keys, to set the emergency brake, to set the transmission in park, etc., but in common with all of these is the fact that only alarms, visible and/or audible, are depended upon to remind the driver to put matters to right before he leaves the vehicle. The problem with alarms alone is the fact that a driver becomes so used to them that he simply ignores them. While in most instances, e.g. when parking on a level street, ignoring an alarm may lead to no danger, there are occasions when this is not so, e.g., parking on a slope. Thus there is a need for a system which does more than merely signal an alarm but rather forcibly calls the attention of the driver to an alarm to put matters to right before he is able to exit the vehicle.

The broad object, therefore, of the invention is to provide a system for automatic transmission vehicles whose function is to sound alarms calling attention to the oversight or to vehicle derangement while the driver is forcibly reminded to give heed to the alarms before he is able to exit the vehicle.

SUMMARY OF THE INVENTION

The invention comprises a lock bar for at least the driver's side door which, as soon as the shift lever is moved to any position except park, is moved to lock the door. When the vehicle arrives at its destination but the driver neglects to move the shift lever to latched park, as soon as he tries to open the driver-side door by its handle an alarm is sounded while the lock bar remains in its locking position thus forcibly reminding the driver that the shift lever is not in park. As soon as the lever is placed in latched park, the lock bar is shifted to a non-locking position and the driver is able to open the door by the usual latch operating system of conventional construction responsive to movement of the door handle in a door opening direction.

The invention includes a second alarm responsive to a broken or maladjusted shift linkage which permits the shift lever to be moved to park yet the linkage remains in its preset position not in park which is to say the linkage remains in any preset position except park. Under these conditions the invention provides that the driver side door remains locked while the broken/maladjustment alarm sounds. Because the door remains locked, the driver's attention is drawn to the second alarm whereupon he is reminded to set the hand brake after which he may move a normally open emergency switch to closed position which completes a circuit to unlocking electromagnetic means which moves the lock bar to its unlocking position enabling the driver to leave the vehicle when he again operates the door handle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is similar to FIG. 1 but showing an improvement.

DETAILED DESCRIPTION OF THE INVENTION

Figure 1:
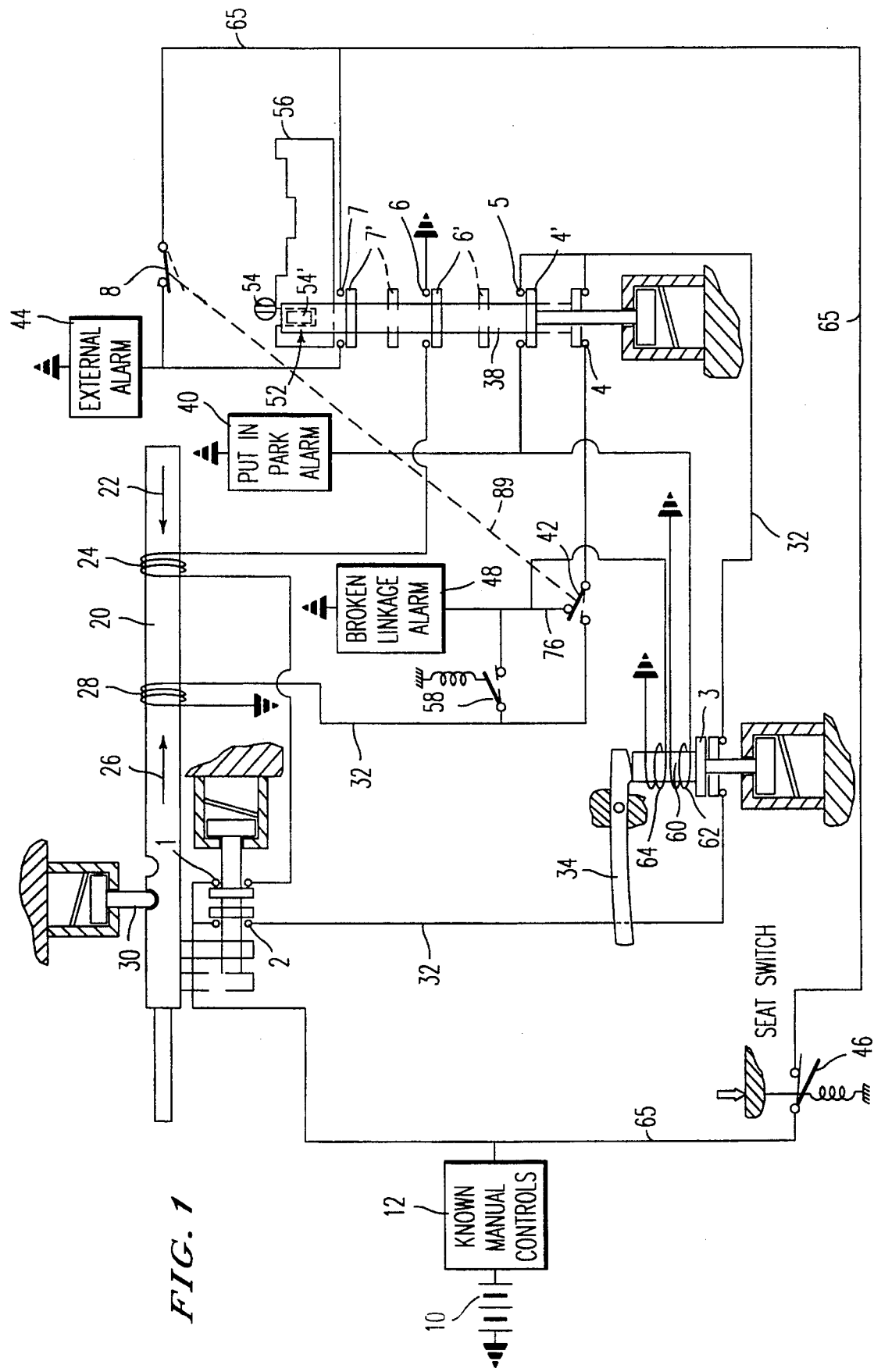
FIG. 1 is a highly schematic showing of the system of the invention superimposed on a highly schematic showing of a conventional automatic shift arrangement.

At the outset, because of the unusual number of switches, applicant has applied as reference characters the numerals 1 through 8 to switches shown in FIG. 1 which are not readily distinguished from each by conventional terminology. As will be apparent there are more than eight switches but the remainder are readily distinguishable by conventional terminology. It is hoped that applicant's somewhat unusual procedure in connection with switches 1 through 8 will be helpful to a reader and lessen possible confusion.

To proceed with the detailed description the numeral 10 designates a source of electric power and 12 designates manual controls which may be substantially the same as in FIG. 1 of applicant's prior U.S. Pat. No. 5,015,991. These controls are not relevant to the present invention. The invention is utilized in conjunction with a conventional shift lever movable between a latched park position and any one of a number of other positions except park.

The invention includes a door lock bar 20 for at least the driver's side door (not shown), and for locking the door the bar is extended in the direction of arrow 22 upon energization of locking electromagnetic means 24, which may be a conventional solenoid coil. The bar is retracted in a door unlocking direction, indicated by the arrow 26, upon energization of unlocking electromagnetic means 28. The bar 20 is retained in either its lock or unlock position by a spring loaded detent 30.

First and second switches 1, 2 are connected in parallel between the source of electrical power 10 and the locking and unlocking electromagnetic means 24, 28, respectively, the switches being movable by the lock bar 20 between a first position enabling the locking electromagnetic means 24 to be energized, and the unlocking electromagnetic means 28 to be deenergized, and vice-versa when the lock bar is moved to a second position.

Circuitry, broadly indicated by the numeral 32, extends between the unlocking electromagnetic means 28 and the second switch 2. The circuitry includes a third normally open switch 3 which is closed upon operation of a driver's side door handle 34 in a door opening direction, and fourth and fifth switches 4, 5 connected in parallel. The unlocking electromagnetic means 28 is connected in series with switch 4 the latter being closed only when the shift lever is in park.

The tang 54 or inner end of the shift lever mounted on the steering column is spring loaded to force the tang against the contact surface of the insert plate 56 normally associated with the steering column. Tang 54 may instead be a detent of the type which restrains floor mounted shift levers, or the shift lever itself where the shift lever protrudes from an insert plate as the shift lever cover. More generally, the tang 54 may instead be any spring loaded component or part of the shift lever which is latched in park slot 52 of the insert plate, as shown in FIG. 1.

The conventionally spring loaded bridge carrying member 38 is in the upward position in all shift lever positions other than park and is moved into in the downward position as the tang 54 enters park slot 52 when the gear shift lever is in park (shown at 54') In the upper position, bridges 4', 6' and 7' serve switches 4, 5, 6 and 7. When the shift lever is moved to park, the tang 54 is lowered by a spring (not shown) which forces the tang 54 against the stepped surfaces and into the park slot 52 of the insert plate 56, thereby lowering bridge carrying member 38. Bridges 4', 6' and 7' thus open switches 5, 6 and 7 while bridge 4' is moved to the dotted line position of FIG. 1 to close switch 4, all for reasons which will become clear as the description proceeds.

A put-in-park alarm 40 is connected in series with the fifth switch 5, the unlocking electromagnetic means 28 being energized to retract said door lock bar 20 whenever the door handle 34 is moved in a door opening direction to close switch 3 and the shift lever is in park so as to close switch 4. It should be understood that when the door handle 34 is moved in a door opening direction, the handle operates conventional door latching mechanism (not shown) so that the door is opened in the usual manner. Should, however, the shift lever be in any position except park it will be apparent in FIG. 1 that switch 4 is open and switch 5 is closed. Now when the driver depresses the handle 34 the unlocking coil 28 cannot be energized because switch 4 is now open and because switch 5 is closed, when the driver moves the handle in a door opening direction to close switch 3 a circuit is completed to the put-in-park alarm 40 and because the door won't open, the driver's attention is attracted to the alarm signal and he will invariably place the shift lever in park whereupon the switch 4 is closed to complete the circuit to the unlocking electromagnetic means 28 and upon the next operation of the door handle 34 the lock bar 20 is retracted and the door opens in a normal manner.

Applicant deliberately has not arranged the system to retract the lock bar automatically upon movement of the shift lever to park but rather the driver must operate the door handle a second time to effect retraction of the bar. This is because there may be situations where it is highly desirable that the door remains locked even after the driver has been reminded to move the lever to park. One such situation would be where there is a threatened car jacking.

Though the switch 6 has been alluded to, its function has not been described. As is clear, switch 6 is in series with the locking electromagnetic means 24 and the switch is closed when the locking bar is in its unlocking position. Thus when the shift lever is moved to any position except park the locking electromagnetic means 24 is energized via switches 1 and 6 and the bar moves to its locking position, opening switch 1 and closing switch 2. When the shift lever is moved to park, switch 6 is opened and when the driver moves the handle 34 to open the door, the unlocking electromagnetic means 28 is energized through switches 2, 3, and 4. It will be noted that a double acting switch 42 is in series with switch 4 and the opening electromagnetic means 28. During normal operation the switch 42 occupies the dotted line position and seldom interferes with normal operation of the system. The switch 42 occupies the full line position upon movement of the shift lever to any position except park and also in response to a broken or maladjusted shift linkage even after the shift lever is moved to park as will be explained in greater detail below.

The invention also includes an external alarm 44 directed to the exterior of the vehicle. The bridge-carrying member 38 carries a seventh switch 7 which is closed when the shift lever is in any position except park and is opened when the shift lever 14 is moved to park. A normally biased-closed seat switch 46 is provided in series between said source of power and the switch 7, the seat switch 46 being opened in response to the weight of a driver seated in a normal position for driving the vehicle. When the shift lever is in any position except park and switch 7 is thereby closed, should the driver thereafter, for any reason, leave his normal driving position, as for example, by sliding to the passenger side of the seat, the external alarm is energized primarily for the purpose of warning by-standers that the vehicle may be in a dangerous condition. As soon as the shift lever is moved to park, the switch 7 is opened and the external alarm is extinguished.

Referring to FIGS. 1 and 2, the invention includes a broken or maladjusted linkage alarm 48 and a conventional shift linkage as shown, for example, in FIG. 1 of my prior U.S. Pat. No. 5,015,991. The previously referred to double-acting switch 42 is connected by linkage 89 to be movable in unison with an eighth switch 8 (described below in greater detail) between a first dotted line position connecting the fourth switch 4 to the unlocking electromagnetic means 28 and a second full line position connecting the fourth switch 4 to the broken/maladjusted linkage alarm 48 while disconnecting the unlocking electromagnetic means 28 from the fourth switch 4. When the shift lever is moved to park but, due to a broken or maladjusted shift linkage the double acting switch 42 remains in its full line position connecting the broken/maladjusted linkage alarm to switch 4. This is because it and the switch 8 are located in a manner analogous to switch 81 in FIG. 1 of my prior U.S. Pat. No. 5,015,991, and respond to, e.g., the position of the rooster-comb of the linkage.

In accordance with the invention, the eighth switch 8 is connected between the seat switch 46 and the external alarm 44. When switch 8 is in its closed full line position (corresponding to a linkage malfunction), the external alarm 44 is connected to the seat switch 46. When the shift lever is moved to park and the shift linkage is functioning normally, the switch 8 is moved to the dashed line open position at the same time as the switches 7 and 42 are likewise opened. However, in the event of a broken or maladjusted linkage, the switch 8 remains closed and thus the external alarm is energized as soon as the driver leaves his normal driving position. Thus, as soon as the handle 34 is operated in a door opening direction, the lock bar remains in its locking position because both of the electromagnetic means 24, 28 are disconnected from the power source, but the broken/maladjusted linkage alarm 48 is energized.

When there is a broken or maladjusted linkage it has been demonstrated that the lock bar remains in its locking position. Because this could be dangerous under certain circumstances the invention includes a normally open, manually closeable switch 58 connected in series with the double acting switch 42 and is connected to circuit 32. The switch 58 is connected to the unlocking electromagnetic means 28 whereby in an emergency an occupant of the vehicle can close the switch 58 and effect retraction of the lock bar 20 even though the double acting switch 42 is in its second, full line position and the shift lever is in park.

In accordance with the invention an armature 60 is fixed to door handle operated switch 3. An electromagnetic coil 62 surrounds the armature 60 and is connected to the put-in-park alarm 40 whereby when handle operated switch 3 is closed, the switch 3 is retained closed and the put-in-park alarm 40 energized until the shift lever is put-in-park to deenergize the put-in-park alarm 40.

Another feature of the invention resides in elongating the armature 60 carried by door operated switch 3 and surrounding the elongated armature with a second coil 64 which is connected to the broken/maladjusted linkage alarm 48 and is continuously energized to retain switch 3 closed and alarm 48 energized.

Another feature of the invention is illustrated in FIG. 2 and comprises an auxiliary circuit 66 which may be substituted for some circuitry of FIG. 1, such as the switch 8 and the connection 89, or may be used in conjunction with all the circuitry of FIG. 1. A normally open auxiliary switch 68 in the circuit 66 has an operative connection 70 between the normally open manually closeable emergency switch 58 whereby said auxiliary switch 68 is moved in unison between its open and closed position with emergency switch 58 and, when closed, effects energization of the external alarm 44. The auxiliary switch may carry an armature 72 surrounded by an electromagnetic coil 74 connected to the external alarm 44 whereby when the normally open, manually closeable switch 58 is closed in an emergency, both that switch 58 and the auxiliary switch 68 are retained closed to energize the external alarm 44 so long as the auxiliary switch is maintained in its closed condition. The seat switch 46 may be added to circuit 66 between switch 68 and alarm 54 so that the external alarm is not energized until the driver leaves his seat.

It is believed that the operation of the invention should be apparent from the foregoing. An important aspect of the invention resides in the all important feature of reminding the driver to put the shift lever in park not only by the put-in-park alarm which is energized when the door handle 34 is moved in a door opening direction but by the inability of the door handle to open the door until the lever is placed in park. This is the root cause of many accidents some of which are fatal. Another cause of serious accidents is accidental movement of a vehicle due to broken or maladjusted shift linkage which can be especially dangerous because the shift lever has already been moved with accustomed ease into park, though the linkage may be still in drive. Thus the invention, when it senses such a condition, again prevents the door from being opened and at the same time energizes a second broken linkage alarm 48, distinctly different from the put-in-park alarm 40, to warn the driver that he has a serious problem and that he must immediately apply his parking brakes. Thereafter the driver may exit the vehicle by operation of the emergency normally open, manually closeable switch 58.

The external alarm warns the public that the vehicle is not in a safe park position if the driver hurriedly slides across the front seat and leaves by the passenger door or uses the auxiliary switch to open the driver's door, ignoring the internal put-in-park and broken linkage alarms.

Obviously, numerous modifications and variations of the present invention are possible in light of the above teachings. It is therefore to be understood that the invention may be practiced otherwise than as specifically described herein.

I claim:

1. Vehicle door lock shift lever interlock system comprising:

a source of electrical power, a shift lever movable between park and any position except park, a door lock bar, locking electromagnetic means for extending said lock bar in a door locking direction, unlocking electromagnetic means for retracting said lock bar in a door unlocking direction, first and second switches connected in parallel between said source of electrical power and said locking and unlocking electromagnetic means, respectively, said switches being movable by said lock bar between a first position enabling said locking electromagnetic means to be energized and said unlocking electromagnetic means to be deenergized and vice versa, circuitry between said unlocking electromagnetic means and said second switch, said circuitry including a third normally open switch closeable upon operation of a driver's side door handle in a door opening direction, and fourth and fifth switches connected in parallel, wherein said unlocking electromagnetic means is connected in series with said fourth switch which is closed only when said shift lever is in park, and a put-in-park alarm connected in series with said fifth switch which is closed whenever said shift lever is in any position except park, wherein said unlocking electromagnetic means is energized to retract said door lock bar when said shift lever is in park and said door handle is moved in a door opening direction, said put-in-park alarm being energized but not said unlocking electromagnetic means whenever said shift lever is in any position except park and said door handle is moved in a door opening direction.

2. The system of claim 1 including a sixth switch in series with said locking electromagnetic means which is open to prevent energization of said locking electromagnetic means when said shift lever is in park and closed to effect energization of said locking electromagnetic means when said shift lever is in any position except park.

3. The system of claim 2 including an external alarm directed to the exterior of said vehicle, a seventh switch which is closed when said shift lever is in any position except park and opened when said shift lever is in park, a normally biased closed seat switch in series between said source of power and said seventh switch, said seat switch being opened in response to the weight of a driver seated in a normal position for driving the vehicle, said external alarm being energized when said shift lever is in any position except park so that said seventh switch is closed and the driver thereafter, for any reason, leaves his normal driving position, whereby said seat switch automatically closes.

4. Vehicle door lock shift lever interlock system comprising:

a source of electrical power, a shift lever movable between park and any position except park, a door lock bar, locking electromagnetic means for extending said lock bar in a door locking direction, unlocking electromagnetic means for retracting said lock bar in a door unlocking direction, first and second switches connected in parallel between said source of electrical power and said locking and unlocking electromagnetic means, respectively, said switches being movable by said lock bar between a first position enabling said locking electromagnetic means to be energized and said unlocking electromagnetic means to be deenergized and vice versa, circuitry between said unlocking electromagnetic means and said second switch, said circuitry including a third normally open switch closeable upon operation of a driver's side door handle in a door opening direction, and fourth and fifth switches connected in parallel, wherein said unlocking electromagnetic means is connected in series with said fourth switch which is closed only when said shift lever is in park, and a put-in-park alarm connected in series with said fifth switch which is closed whenever said shift lever is in any position except park, wherein said unlocking electromagnetic means is energized to retract said door lock bar when said shift lever is in park and said door handle is moved in a door opening direction, said put-in-park alarm being energized but not said unlocking electromagnetic means whenever said shift lever is in any position except park and said door handle is moved in a door opening direction;

a broken or maladjusted linkage alarm, a shift linkage controlled by said shift lever, a double acting switch movable between a first position connecting said fourth switch to said unlocking electromagnetic means and a second position connecting said fourth switch to said broken/maladjusted linkage alarm while disconnecting said unlocking electromagnetic means from said fourth switch, and means for moving said double acting switch to said second position and preventing said double acting switch from moving to said first position when said linkage is not functioning normally.

5. The system of claim 4 including an external alarm directed to the exterior of said vehicle, a normally closed seat switch in the driver's position and being moved to open position by the driver's weight, said seat switch being connected to said power source, and an eighth switch linked to said double acting switch and connected between said seat switch and said external alarm, said eighth switch such that said external alarm is energized whenever the driver for any reason moves from his normal driving position resulting in closure of said seat switch.

6. The system of claim 4 including a normally open, manually closable switch connected in series with said double acting switch and parallel to said broken/maladjusted linkage alarm, said manually closable switch being connected to said unlocking electromagnetic means whereby in an emergency an occupant of the vehicle can close said switch and effect retraction of the lock bar even though said double acting switch is in its second position and said shift lever is in park.

7. The system of claim 1 including an armature on the third door handle operated switch, a electromagnetic coil surrounding said armature and connected to said put-in-park alarm whereby said third switch is retained closed until said shift lever is moved to park and said fifth switch is opened to deenergize said put-in-park alarm and said electromagnetic coil is deenergized.

8. The system of claim 4 including an armature on the third door handle operated switch, an electromagnetic coil surrounding said armature and connected to said broken/maladjusted linkage alarm whereby said third switch is retained closed so long as the broken/maladjusted linkage alarm is energized.

9. The system of claim 6 including an auxiliary circuit connecting said external alarm to said power source, a normally closed seat switch in said circuit.

10. The system of claim 6 including an external alarm and a normally open auxiliary switch connected in series between said source of electrical power and said external alarm, wherein said normally open auxiliary switch is operatively connected with said normally open manually closable switch such that said normally open auxiliary switch and said normally open manually closable switch move in unison.

11. The system of claim 10 including a seat switch connected in series with said normally open auxiliary switch.

12. Vehicle door lock shift lever interlock system comprising:

a source of power, a shift lever movable between park and any position except park, a door lock bar, locking means for extending said lock bar in a door locking direction, unlocking means for retracting said lock bar in a door unlocking direction, first and second switches connected in parallel between said source of power and said locking and unlocking means, respectively, said switches being movable between a first position enabling said locking means to be energized by said source of power and said unlocking means to be deenergized from said source of power and vice versa, circuitry between said unlocking means and said second switch, said circuitry including a third normally open switch closeable upon operation of a driver's side door handle in a door opening direction, and fourth and fifth switches connected in parallel, wherein said unlocking means is connected in series with said fourth switch which is closed only when said shift lever is in park, and a put-in-park alarm connected in series with said fifth switch which is closed whenever said shift lever is in any position except park, wherein said unlocking means is energized to retract said door lock bar when said shift lever is in park and said door handle is moved in a door opening direction, said put-in-park alarm being energized but not said unlocking means whenever said shift lever is in any position except park and said door handle is moved in a door opening direction.

13. The system of claim 12 including a sixth switch in series with said locking means which is open to prevent energization of said locking means when said shift lever is in park and closed to effect energization of said locking means when said shift lever is in any position except park.

14. The system of claim 13 including an external alarm directed to the exterior of said vehicle, a seventh switch which is closed when said shift lever is in any position except park and opened when said shift lever is in park, a normally biased closed seat switch in series between said source of power and said seventh switch, said seat switch being opened in response to the weight of a driver seated in a normal position for driving the vehicle, said external alarm being energized when said shift lever is in any position except park so that said seventh switch is closed and the driver thereafter, for any reason, leaves his normal driving position, whereby said seat switch automatically closes.

15. The system of claim 12 including:

a broken or maladjusted linkage alarm, a shift linkage controlled by said shift lever, a double acting switch movable between a first position connecting said fourth switch to said unlocking means and a second position connecting said fourth switch to said broken/maladjusted linkage alarm while disconnecting said unlocking means from said fourth switch, and means for moving said double acting switch to said second position and preventing said double acting switch from moving to said first position when said linkage is not functioning normally.

16. The system of claim 15 including an external alarm directed to the exterior of said vehicle, a normally closed seat switch in the driver's position and being moved to open position by the driver's weight, said seat switch being connected to said power source, and an eighth switch linked to said double acting switch and connected between said seat switch and said external alarm, said eighth switch such that said external alarm is energized whenever the driver for any reason moves from his normal driving position resulting in closure of said seat switch.

17. The system of claim 16 including a normally open, manually closable switch connected in series with said double acting switch and parallel to said broken/maladjusted linkage alarm, said manually closable switch being connected to said unlocking means whereby in an emergency an occupant of the vehicle can close said switch and effect retraction of the lock bar even though said double acting switch is in its second position and said shift lever is in park.

18. The system of claim 12 including means for retaining said third switch closed until said shift lever is moved to park and said fifth switch is opened to deenergize said put-in-park alarm and release said means for retaining said third switch closed.

19. The system of claim 12 including an armature on the third door handle operated switch, a electromagnetic coil surrounding said armature and connected to said put-in-park alarm whereby said-third switch is retained closed until said shift lever is moved to park and said fifth switch is opened to deenergize said put-in-park alarm and said electromagnetic coil is deenergized.

20. The system of claim 15 including a second means for retaining said third switch closed so long as the broken/maladjusted linkage alarm is energized.

21. The system of claim 17 including an auxiliary circuit connecting said external alarm to said power source, a normally closed seat switch in said circuit.

22. The system of claim 17 including an external alarm and a normally open auxiliary switch connected in series between said power source and said external alarm, wherein said normally open auxiliary switch is operatively connected with said normally open manually closable switch such that said normally open auxiliary switch and said normally open manually closable switch move in unison.

23. The system of claim 22 including a seat switch connected in series with said normally open auxiliary switch.

* * * * *